March 3, 1964   F. V. ATKESON   3,122,953
APPARATUS AND METHOD OF CUTTING GLASS
Original Filed Sept. 24, 1956

INVENTOR.
FLORIAN V. ATKESON

United States Patent Office 3,122,953
Patented Mar. 3, 1964

3,122,953
APPARATUS AND METHOD OF CUTTING GLASS
Florian V. Atkeson, Springdale, Pa., assignor to Pittsburgh Plate Glass Company, Pittsburgh, Pa., a corporation of Pennsylvania
Continuation of abandoned application Ser. No. 611,707, Sept. 24, 1956. This application Apr. 19, 1961, Ser. No. 104,144
11 Claims. (Cl. 83—7)

This invention relates to an apparatus and a method for cutting glass and especially relates to a method in which the cut is opened almost simultaneously with the scoring of the glass sheet.

In the usual method of cutting glass a fixed diamond cutter or a wheel cutter in which the wheel is made of high carbon steel, tungsten carbide or similar material is used to score the glass sheet and then a tensioning moment is applied at one end of the score line to open or run the cut. An illustrative description of a glass cutting method using a conventional wheel cutter is described and claimed in U.S. Patent No. 2,756,545 granted to Florian V. Atkeson on July 31, 1956. In the use of cutter wheels for scoring the glass sheet the wheel is conventionally thin, for example, the cutter wheel has a thickness of about $\frac{1}{32}$ inch. The wheel has a V-shaped edge in which the including angle of the edge is required for conventional mechanical scoring to be within a limited range. A cutter wheel having an edge with an included angle of 98 degrees is the wheel commercially available that has the lowest included angle for glass scoring. The wheel having the greatest included angle of the V-shaped edge for conventional glass cutting has an included angle of 158 degrees. In the formation of a score line for the edging of a window glass ribbon and for the cross cutting to produce sheets of window glass from the ribbon, the cutter wheel used has an included angle of the V-shaped edge of 134 degrees. Similarly the cutter wheel used in forming a score line on polished plate glass such as $\frac{1}{4}$ inch polished plate glass has an included angle of 134 degrees. For the scoring of thick polished plate glass, i.e., polished plate glass having a thickness greater than a half inch the cutter wheels used for scoring have included wheels that have an included angle up to 153 degrees. The use of such wheels merely produced a score line and a mechanical load was used to force the cutter wheel against the glass while providing relative movement to form a score line. This type of scoring has included pattern cutting as well as the production of rectilinear score lines.

Ultrasonics has been utilized for the drilling or shaping of refractory articles such as glass. This method has been described in U.S. Patent No. 2,580,716 granted to Lewis Balamuth on January 1, 1952, and in various articles including the article entitled "A High-Frequency Reciprocating Drill", Journal of Scientific Instruments, Vol. 30, March 1953, pp. 72–74, and the article entitled "Ultrasonic Machining of Brittle Materials," Electronics, January 1956, pp. 132–135. In this ultrasonic machining or drilling a tool is mounted to an ultrasonic transducer to provide ultrasonic mechanical vibration at the end of the tool. The end of the tool is spaced a very slight distance from the work piece that is to be drilled or shaped and a fluid suspension of an abrasive is fed between the end of the tool and the work piece. The ultrasonic vibration at the end of the tool is transmitted to the abrasive particles between it and the piece being worked. Thus these particles are provided with ultrasonic vibration so that the particles at a high velocity contact the work piece with the result that particles of the work piece are removed. This ultrasonic abrasive drilling has been utilized for drilling holes in glass.

As mentioned above, the conventional use of cutter wheels merely produces a score line on the glass sheet and requires a subsequent treatment to run the cut so that two pieces of glass will be produced. This method requires two operations in order to produce the cutting of the glass sheet. In the conventional scoring the depth of the score is limited in extent so that the amount of force required to run the cut especially for the thicker glass sheets is considerable.

An object of the present invention is to provide an apparatus and a method for scoring a glass sheet in which the depth of the score is substantially greater than produced by conventional mechanical scoring with cutter wheels.

Another object of this invention is to provide an apparatus and a method for scoring a glass sheet in which the cut is run automatically and almost simultaneously with the production of the scoring.

These and other objects of the present invention will be apparent to one skilled in the art from the description that follows when taken in conjunction with the drawing in which.

Figure 1:
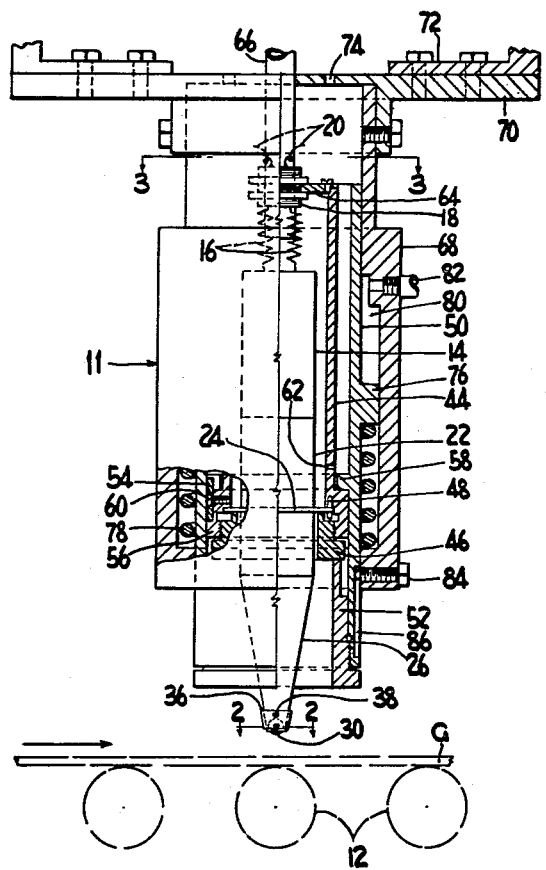
FIG. 1 is a view partly in elevation and partly in section of a preferred embodiment of the apparatus of the present invention along with a schematic view of a glass sheet on a conveyor.
Figure 3:
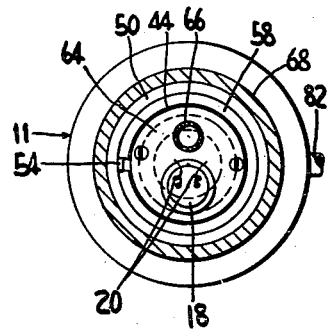
FIG. 3 is a cross section of the apparatus taken along line 3—3 of FIG. 1.

I have found that a score line can be produced on a glass sheet by contacting the glass sheet with a wheel having a V-shaped edge while providing relative movement between the wheel and the glass sheet in which the score line is considerably deeper than heretofore produced and under certain conditions is sufficiently deep so that the cut will automatically run to produce a cut line completely through the glass. This is accomplished in accordance with the invention by providing an ultrasonic vibration to the wheel during the relative movement of the wheel and the glass sheet while the wheel and glass sheet are in contact. A load is imposed upon te wheel to maintain adequate contact between the wheel and the glass sheet and this load amounts to about 10 to 30 pounds. The relative movement between the wheel and the glass sheet can be varied widely such as between about 5 to 70 feet per minute. The ultrasonic vibration imparted to the wheel can be varied widely. This vibration has a minimum frequency of about 20 kilocycles per second. The maximum frequency of ultrasonic vibration is about 200 kilocycles per second. The preferred range of the ultrasonic vibration imparted to the wheel is between about 20 and 80 kilocycles per second. Under certain conditions there is produced merely a score line that is deeper than heretofore produced by the conventional use of providing relative movement of a cutter wheel and a glass sheet. Under the preferred conditions of the present invention not only is there produced a deeper cut during the scoring but there is also a running of the cut that follows the scoring automatically and this running of the cut results from the aforesaid application of ultrasonic vibration to the wheel. This almost simultaneous running or opening of the cut is made possible by the proper choice of the wheel, the power input of the ultrasonic vibration, the load imparted to the wheel and the thickness and nature of the glass sheet. In the present invention that utilizes ultrasonic vibration there is no feeding of an abrasive between the glass and the wheel. As a matter of fact, feeding of an abrasive such as used in conventional ultrasonic shaping or drilling of glass would adversely affect the life of the wheel.

The wheel used in the present invention preferably has the thickness of wheels conventionally used for scoring glass sheets and under certain conditions wheels used in the conventional scoring can be utilized. Wheel thickness can be varied. For example, the wheel thickness can be between about 1/32 and 5/32 inch. The wheels of the present invention have a V-shaped edge in which the included angle of the V-shaped edge is between about 135 and 168 degrees. As will be seen from the description hereinafter presented, wheels having a V-shaped edge with an included angle of 98 degrees and greater than 168 degrees are inoperative for scoring the glass sheet with or without almost simultaneously running the cut obtained by the scoring. In the preferred embodiment of the invention in which there is an automatic running of the cut that follows the scoring there is preferably utilized a wheel in which the V-shaped edge has an included angle between 139 and 166 degrees. The choice of the included angle of the V-shaped edge wheel within this range is dependent upon the nature of the glass sheet, the thickness of the glass sheet and the frequency of the ultrasonic vibration that is imparted to the wheel. The load on the wheel is somewhat dependent upon the relative movement between the wheel and the glass. This relative movement can be varied widely such as about 5 to 70 feet per minute (preferably about 9 to 25 feet per minute) in which case the load on the wheel is between about 10 to 30 pounds (preferably about 12 to 20 pounds) with the load somewhat increasing with the increase in relative movement.

Various transducers for providing ultrasonic vibration are available. These transducers can be of various types including the piezoelectric and the magnetostrictive types. The magnetostrictive type of transducer is preferred. Some of these transducers that are available have fundamental frequency of about 20 kilocycles per second but they also have other frequencies of vibration and by proper input of frequency of electric current the transducers will operate with a higher power at the higher frequencies than they would operate if the input of frequency of the electric current to the transducer was controlled to produce the maximum power of the fundamental frequency of the transducer. The construction and operation of the transducer per se forms no part of the present invention. This construction and operation is well known to those skilled in the art so that the specification will not present details relative to the transducer and the mode of its operation.

The apparatus of the present invention includes a wheel that is rotatably mounted to a support and the wheel through the support is mechanically coupled to an ultrasonic transducer so that the latter provides ultrasonic mechanical vibration to the wheel. This vibration is preferably imparted to the wheel in a direction normal to the axis of rotation of the wheel.

Referring to the drawing that illustrates a preferred embodiment of the apparatus of this invention, the cutting tool generally indicated at 11 is shown along with a schematic showing of a glass sheet G moving relative to the cutting tool 11 by means of conveyor rolls 12 that are driven by a motor (not shown). The cutting tool 11 has an ultrasonic transducer 14, either a magnetostrictive or a piezoelectric transducer, to which is connected wires 16 that are connected at the other end to a cable connector 18. Wires 20 are connected to cable connector 18 and to a high frequency generator (not shown). The bottom end of ultrasonic transducer 14 is brazed to a coupling bar 22 having a flange 24. The other end of bar 22 has brazed thereto a focusing cone 26.

Figure 2:
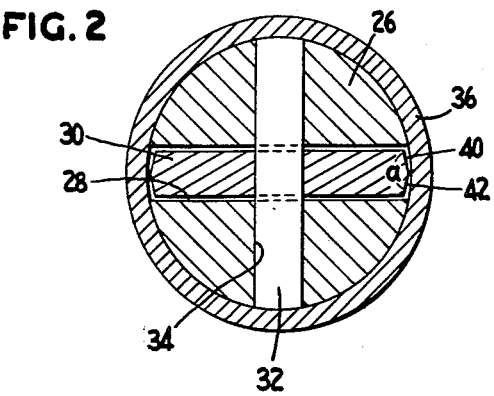
FIG. 2 is a cross section of the apparatus taken along line 2—2 of FIG. 1.

The bottom end of cone 26 has a transverse slot 28 in which is mounted a wheel 30. An axle 32 is mounted at the end portion of cone 26 in a passageway 34 that is normal to slot 28 so that axle 32 extends across slot 28. The wheel 30 is rotatably mounted on axle 32 and extends below the bottom tip of cone 26. The axle 32 is maintained in passageway 34 by sleeve 36 fixed in position on cone 26 by set screw 38. As seen in FIG. 2, the wheel 30 has a V-shaped edge and the surfaces 40 and 42 of the V-shaped edge form an included angle $a$.

The flange 24 of bar 22 is mounted to a housing 44 by means of a nut 46. Rotation of flange 24 relative to housing 44 is prevented by pins 48 extending through holes in flange 24 and into recesses of housing 44. The housing 44 and nut 46 are supported within a piston 50 by a nut 52. The rotation of housing 44 relative to piston 50 is prevented by a key 54 in a slot in a shoulder 56 of housing 44 and a slot in an internal flange 58 of piston 50. The key 54 is maintained in the slots by a screw 60 threaded into shoulder 56 of housing 44. The housing 44 has openings 62 in the sidewall above internal flange 58 of piston 50. A cover plate 64 is bolted to housing 44. A pipe 66 extends through an opening in cover plate 64. The cable connector 18 extends through cover plate 64.

The piston 50 is mounted within a cylinder 68 to which is bolted a cover plate 70 that is bolted to a support 72. The pipe 66 extends through cover plate 70 and is connected to an air pressure source (not shown) so that cooling air can be introduced by pipe 66 into the chamber provided by housing 44. The air will leave housing 44 through opening 62 to reach the annular space between housing 44 and piston 50 above flange 58 and this air will leave the chamber provided by piston 50 and cover plate 70 through an opening 74 in cover plate 70. An external flange 76 of piston 50 within cylinder 68 rests on a spring 78 that biases piston 50 into the position out of contact with the glass sheet as shown in FIG. 1. A chamber 80 above flange 76 and between piston 50 and cylinder 68 communicates with a pipe 82. The air pressure in chamber 80 is controlled by the introduction or withdrawal of air under pressure through pipe 82 to an air pressure source (not shown). A set screw 84 is threaded through cylinder 68 and extends into a longitudinal slot 86 in piston 50 so that rotation of piston 50 relative to cylinder 68 is prevented during movement of piston 50 within cylinder 68 by the counteraction of the forces of the spring and the air pressure in chamber 80.

In operation, of course, the tool 11 has air under pressure within chamber 80 so that piston 50 is moved downwardly thereby moving wheel 30 against glass G. The load on wheel 32 by means of the air pressure within chamber 80 is controlled within the desired range of load mentioned above. It should be noted that one of the conveyor rolls 12 supports the glass directly below the contact of wheel 30 against glass G. During operation the transducer 14 is provided with relatively high frequency alternating current under conditions well known in the art to impart an ultrasonic mechanical vibration in transducer 14. The lengths of transducer 14 and coupling bar 22 are chosen so that the connections between transducer 14 and bar 22 as well as between bar 22 and focusing cone 26 are at the velocity nodes of the ultrasonic vibration in order that these connections by a customary brazing will be maintained.

The following examples are illustrative of some of the results that have been obtained by moving a glass sheet relative to a wheel having a V-shaped edge while maintaining a load on the wheel to provide contact between the wheel and the glass and at the same time imparting ultrasonic mechanical vibration to the wheel by the use of an ultrasonic transducer. These examples are based on operations in which the transducer was caused to impart an ultrasonic vibration to the wheel by applying an alternating current to the transducer in which the alternating current had a relatively high frequency, i.e., the frequency of the ultrasonic vibration to be produced by the transducer. Of course, as mentioned above, the transducer not only has the desired ultrasonic mechanical vibrational frequency but also there is formed vibrations of frequencies different from that desired. In all of these examples the relatively high frequency of the alternating current provided to the transducer was obtained by means of a 600-watt ultrasonic generator. Various transducers of the magnetostrictive or piezoelectric type were used. The amount of power of the ultrasonic mechanical vibration is dependent upon the amount of power electrically fed into the transducer and this latter power is customarily recorded by measuring the direct current on the plate of the ultrasonic generator. This current is measured in milliamperes.

In the examples presented below the wheel was mounted in a conventional pillow post which was brazed to the bottom of a focusing cone connected by a coupling bar to the transducer. The connections of the pillow post to the cone and the cone to the coupling bar were obtained by brazing. The flange of the coupling bar was at a velocity node of the ultrasonic vibration and the flange was used to support the foregoing unit to a conventional drill press. A conveyor having a number of rubber conveyor rolls, that were power driven, was used to move the glass sheet underneath and across the wheel with one of the conveyor rolls being directly below the wheel. Of course, the axis of rotation of the wheel was normal to the path of movement of the glass sheet. The loading of the wheel against the glass was provided in the conventional manner for applying a load to the tool supported by the drill press support. The amount of mechanical load thereby applied to the wheel was in an amount indicated below in the particular examples. In all of these examples, the thickness of the wheel was the conventional $1/32$ inch thickness used in glass cutter wheels. Some of the wheels had the conventional $7/32$ inch diameter. The wheels were made of tungsten carbide as conventionally used for glass cutter wheels, and, as a matter of fact, some of the wheels, i.e., those having the lower included angle, were wheels that are conventionally used for the heretofore utilized mechanical scoring of glass.

The invention is useful in the cutting of glass sheets especially when the glass is of the lime-soda type. Window and plate glass are conventional examples of the lime-soda glass and these glasses have the following composition:

Percent by weight

Alkali metal oxide such as
 $Na_2O$ and/or $K_2O$ _____ 10 to 18.
Alkaline earth metal oxide,
 such as CaO and/or
 Mgo _____ 5 to 16—the CaO content being at least 5 percent by weight.
$SiO_2$ _____ 65 to 75.
$Al_2O_3$ _____ 0 to 20.

A typical lime-soda glass, known as window glass or drawn sheet glass has the following composition:

$SiO_2$ _____ 71.38 percent by weight (usual variation 71 to 73 percent by weight).
$Na_2O$ _____ 12.79 percent by weight (usual variation 12 to 14 percent by weight).
CaO _____ 9.67 percent by weight (usual variation 8 to 11 percent by weight).
MgO _____ 4.33 percent by weight.
$Na_2SO_4$ _____ 0.75 percent by weight.
NaCl _____ 0.12 percent by weight.
$Fe_2O_3$ _____ 0.15 percent by weight.
$Al_2O_3$ _____ 0.81 percent by weight.

Plate glass has the following typical composition:

Percent by weight
$SiO_2$ _____ 71.52
$Na_2O$ _____ 13.02
CaO _____ 11.62
MgO _____ 2.52
$Na_2SO_4$ _____ 0.76
NaCl _____ 0.12
$Fe_2O_3$ _____ 0.11
$Al_2O_3$ _____ 0.33

*Example I*

Using single strength window glass, i.e., a window glass having a nominal thickness of $3/32$ inch, a magnetostrictive transducer at its fundamental frequency of 22.8 kilocycles per second (kc./sec.), and a tungsten carbide glass cutting wheel having a $1/32$ inch thickness and a $7/32$ inch diameter and an included angle of the V-shaped edge of 139 degrees, a number of the single strength window glass sheets were passed underneath and in contact with the wheel at various speeds and utilizing various degrees of power as measured by the plate current of the ultrasonic generator. The mechanical load on the wheel was about 16 pounds. The results of these tests are tabulated below:

| Speed of glass, ft./min. | Generator plate current, ma. | Results |
|---|---|---|
| 10.1 | 3 | Scored heavily. |
|  | 5 | Scored heavily; cut or fissure driven almost through. |
|  | 5.5 | Cut through completely; fair edge. |
| 19.1 | 5 | Cut opened part of its length. |
|  | 5.5 | Cut through completely; very good edge. |
|  | 6 | Cut through completely; fair edge. |
| 25.0 | 6 | Deep score. |
|  | 7 | Deeper score. |
|  | 8 | Cut through completely; fair edge. |
| 70.7 | 5 | Deep score. |
|  | 7 | Deeper score. |
|  | 9 | Cut through completely; rough edge. |

The foregoing data indicates that for the glass of the thickness tested there was an optimum of power and speed of movement of the glass to produce the most satisfactory cut. The results also indicate that even under those conditions where the cut was not automatically opened back of the scoring that is followed the scoring, there was produced a heavy scoring, i.e., the fissure was driven deeper than would be obtained by conventional mechanical use of this type of cutter wheel at the indicated mechanical load on the wheel, that is, without the assistance of the ultrasonic vibration to the wheel by the transducer. Under those conditions where the edge was not as good as would be desired, of course, the glass edge could be ground and polished under conventional conditions.

*Example II*

Sheets of nominal $1/4$ inch polished plate glass were treated as in Example I using the transducer at 22.6 kc./sec. and a speed or movement of the glass of about 9.5 feet per minute but because of the greater thickness of the glass sheet the generator plate current was increased substantially. Various tungsten carbide wheels each of $7/32$ inch diameter and $1/32$ inch thickness were tested. Using a wheel under a mechanical load of about 16 pounds and having an included angle of 154 degrees and a plate current of 100 milliamperes (ma.) up to 300 ma. there was produced a deep fissure of the glass sheets but the cut was not opened to provide the complete break into two sheets. Likewise with a wheel having an included angle of 156 degrees and at a plate current of 200 to 250 ma. there was obtained a deep cut or fissure and at various points along the score line the cut opened through to the other side of the glass sheet. Using a wheel having an included angle of 158 degrees and a plate current of 150 ma. the sheet was not only scored but the cut was completely opened and the edge produced was of fair quality. With the same wheel and a plate current of 180 ma. the cut was through the glass sheet and the edge had a better quality. With a 160-degree wheel and a 150 ma. plate current there was cutting through the glass sheet and the edge was good and at 130 ma. the edge was very good with complete cutting through the glass. Likewise using plate currents as low as 50 ma. and up to 100 ma. there was cutting through the glass sheet with the quality of the edge being rated from very good to good. Using a 162-degree wheel and a plate current of 150 ma. the glass was cut through and the edge was of fair quality while at 80 ma. the glass was cut through and the edge was very good in quality. Similarly using the 162-degree wheel at 50 ma. the glass was cut through and the edge quality was very good. The foregoing data indicate that the wheel having an included angle of 162 degrees which cannot be used for conventional mechanical cutting of glass was the best wheel of those tested in this example. The data also show that under the conditions of use specified above there is an optimum included angle of 162 degrees for the wheel as used in the present invention.

*Example III*

Sheets of polished plate glass having a nominal thickness of ½ inch were tested for cutting as in Examples I and II using the transducer at a frequency of 22.6 kc./sec., a load on the wheel of about 16 pounds and 7/32 inch diameter tungsten carbide wheels having 1/32 inch thickness. With a wheel having an included angle of 162 degrees and at plate currents that ranged from 100 up to 250 ma. there was produced a deep cut or fissure in the glass but the cut did not extend through the glass. Using a wheel having an included angle of 164 degrees and a plate current of 130 ma. the glass was cut through and the edge was of fair quality. The latter wheel at a plate current of 250 ma. produced a deep cut or fissure that did not extend through the glass. These results indicate that under the condition of frequency indicated there is an optimum angle for the wheel of 164 degrees for cutting the ½ inch polished plate glass with suitable control of the power introduced. This optimum is borne out by the following test in which at 250 ma. plate current wheels having included angles of 166 and 168 produced deep scratches but these were not as deep as the cut produced with the 164 degree wheel. With wheels having included angles of 170 and 172 degrees there was deep gouging of the glass and this condition would not permit running of a cut from the resultant product.

*Example IV*

Using the conditions presented above in respect to Examples I through III a polished plate glass having a nominal thickness of 3/8 inch was tested with wheels having included angles of 172, 174, 176 and 178 degrees. With the 172-degree wheel there was heavy gouging of the glass while with the 174-degree wheel there was a skip scratching and with the 176- and 178-degree wheel there was no effect at all on the glass surface.

*Example V*

Using the conditions mentioned above for Examples I–IV a polished plate glass having a nominal thickness of 5/16 inch was passed under wheels that had the imposed load of about 16 pounds and had various included angles. With a wheel having an included angle of 162 degrees and at a plate current of 150 to 200 ma. there was cutting through the glass to produce two sheets of glass. The edges were rough. With a wheel having an included angle of 162 degrees and at a plate current of 200 ma. there was cutting through the glass and the edges of the two sheets were rough while at 150 ma. plate current there was deep scoring and the cut was almost through the glass. With a 166-degree wheel there was a score line with a cut intermittently through the glass and the edge appeared rough. With a 168-degree wheel at 250 ma. plate current there was no effect on the glass surface.

*Example VI*

Using the conditions of the preceding examples also with a speed of movement of the glass of 9.5 feet per minute and using double strength window glass, i.e., window glass having a nominal thickness of 1/8 inch, three different wheels were tested. A 153-degree wheel at 100 ma. plate current produced a deep scratch on the window glass sheet while at 200 ma. the cut was automatically run so that it was cut throughout. The edge was somewhat rough. Using a 154-degree wheel there was deep, intermittent cutting at 90 ma., almost cutting through at 100 ma. and cutting through at 110 ma. The edge of the cut sheets was of very good quality. Using a 156-degree wheel and 100 ma. plate current there was cutting through the glass and the edge had a good appearance.

Instead of the conventional load of about 16 pounds the 154-degree wheel at 50 ma. plate current and a load of 28 pounds cut through the glass to produce two sheets having very fine quality edge, whereas the conventional load on the wheel and using 50 ma. the cutting was only almost through the glass sheet. It was noticed that in the later case the edge produced was of a very satisfactory quality so that when the cut was run in the conventional manner there would be produced two sheets having edges of very satisfactory quality.

*Example VII*

Using the conditions of Example I on window glass sheets that had either a nominal thickness of 3/16 inch or 7/32 inch and using a 154-degree wheel having a thickness of 1/32 inch and 7/32 inch diameter with the glass speed at 9.5 feet per minute the effect of different plate currents of the ultrasonic generator was studied. With the 3/16 inch window glass at 30 ma. plate current the cut was almost through the glass, whereas at 40 and 50 ma. there was cutting through the glass and the edge was somewhat beaded. Using the 7/32 inch window glass at 20 ma. there was cutting through the glass with a very good edge quality. At 30 ma. there was cutting through the glass and its quality was good, whereas at 50 ma. the edge quality was only fair. At 100 ma. there was cutting through the glass and the edge was rough.

*Example VIII*

Using single strength window glass a number of experiments were carried out with a glass speed of 9.5 feet per minute. The wheels were also tungsten carbide wheels 1/32 inch thick, 7/32 inch in diameter and having different included angles. With a 98-degree wheel and a frequency of about 70 kc./sec. provided by a magnetostrictive transducer there was gouging of the glass with plate currents ranging from 50 to 300 ma. using loads on the wheel of 14 and 28 pounds. These results showed that a wheel having such a small degree for the included angle of the edge of the wheel is not satisfactory for the present invention. Using a 135-degree wheel and the transducer at a frequency of about 70 kilocycles per second with a load of 28 pounds on the wheel there was scoring with only intermittently cutting through the glass at 50 ma. whereas at 200 ma. there was cutting through the glass producing edges of good quality. Using the 135-degree wheel and a load of 18 pounds with the transducer operating at about 70 kilocycles per second there was cutting through the glass with a good edge when using a plate current of 150 to 170 ma. A similar satisfactory edge with cutting through was obtained when the load was reduced to 14 pounds. Likewise this wheel with a transducer providing a frequency of about 40 kilocycles per second and with a load on the wheel of 14 pounds there was cutting through the glass with a good edge at 50 ma. With the transducer providing a frequency of about 20 kilocycles per second, the wheel under a load of about 16 pounds cut through the glass producing cut edges of the resultant two glass sheets that were of fair quality.

*Example IX*

Polished plate glass having nominal thicknesses from 1/8 inch to 5/16 inch were moved relative to and in contact with a tungsten carbide wheel 1/32 inch thick, 7/32 inch in diameter and having an included angle of 162 degrees using a piezoelectric transducer to provide the ultrasonic mechanical vibration of the wheel. The ultrasonic transducer and its generator was operated to provide a frequency of 20 kc./sec. The speed of glass sheet movement was 9.5 ft./min. and the load on the wheel was about 16 pounds. There was not only the scoring of the glass but the opening of the cut followed the scoring automatically as in the preceding examples when there was cutting through the glass. The edge was deemed slightly ragged. When the transducer was operated at about 40 kc./sec. there was likewise cutting through the glass and the edge quality was satisfactory. With operation of the transducer at a frequency of about 70 kc./sec. there was cutting of the glass sheets through to the other side as in the previous experiments. The quality of the edges was very satisfactory.

*Example X*

Using a magnetostrictive transducer to provide an ultrasonic vibration of about 76 kc./sec. and a tungsten carbide wheel having a thickness of 1/32 inch, a diameter of 1/4 inch and an included angle of 154 degrees, cutting tests were carried out on a number of glass sheets with the following results. In all cases the cut was run to the other side of the glass.

| Glass type | Nominal thickness, in. | Plate current, ma. | Edge quality |
|---|---|---|---|
| Window | 1/32 | 40 | Excellent. |
| Do | 1/8 | 60 | Do. |
| Do | 3/16 | 80 | Good. |
| Do | 7/32 | 100 | Do. |
| Polished plate | 1/8 | 70 | Excellent. |
| Do | 1/4 | 100 | Fair. |

*Example XI*

Using the 76 kc. magnetostrictive transducer a number of tests on sheets of window glass of various nominal thicknesses were cut with wheels of different included angles. The optimum included angle of the V-shaped edge of the wheel for best scoring with automatic running of the cut through the glass increased with increase in thickness of the glass sheet. The optimum angle for single strength window glass (nominal thickness of 3/32 inch) was 154 degrees. The optimum for double strength window glass (nominal thickness of 1/8 inch) was 155 degrees. For 3/8 inch (nominal thickness) window glass the optimum was from 156 to 162 degrees and the optimum for 7/32 inch (nominal thickness) window glass was 163 degrees.

The foregoing examples are illustrative of the numerous tests of successful cutting of glass sheets that have been carried out in accordance with the method of the present invention and using the apparatus of this invention. Various ranges of conditions have been described and are illustrated in the examples. For particular glass types and ultrasonic frequencies there are preferred ranges of other conditions. For example, when using a transducer at about 40 to 50 kc./sec., a load on the wheel of about 12 to 20 pounds, an included angle of 139 to 164 degrees and a glass sheet speed of about 9 to 25 feet per minute are preferred for cutting glass sheets with automatic running of the cut. When the glass sheet is polished plate glass having a nominal thickness of 1/8 to 5/16 inch the optimum angle of the wheel edge is between about 154 and 162 degrees with the relative movement of the glass being between about 9 and 20 feet per minute and when the plate glass is 1/8 inch thick, this angle is 154 degrees. When using a transducer at about 76 kc./sec. to satisfactorily cut and automatically open the cut for 1/8 to 1/4 inch polished plate glass the preferred wheel edge angle is 154 degrees and the preferred load on the wheel and glass speed are between about 12 and 20 pounds and between about 9 and 20 feet per minute, respectively. When using a transducer at about 76 kc./sec. to cut through window glass sheets having nominal thicknesses between 3/32 and 7/32 inch the preferred range of included angle of the wheel is between about 154 and 163 degrees, whereas when using a transducer at 23 kc./sec. on the 3/32 inch window glass the preferred included angle of the wheel is 139 degrees with a load on the wheel of between about 12 and 20 pounds with glass to wheel relative movement of about 9 to 20 feet per minute.

Various other types of glass have been successfully cut (with automatic running under suitable conditions) and these include drawn sheets of glass having compositions illustrated by U.S. Patents Nos. 2,669,807 and 2,669,808 as well as opaque colored glasses such as fluoride-containing opaque glass illustrated by U.S. Patents Nos. 2,599,349 and 2,683,666. Satisfactory cutting in accordance with this invention was accomplished with rough rolled plate glass.

The invention has been used satisfactorily to cut through the glass when the novel tool was mounted on a pattern cutting machine and used thereon to cut through window and polished plate glass. Similarly it has been used satisfactorily as a hand cutting tool in which case, of course, the load on the wheel was applied manually and the tool merely had a sleeve to which was mounted the flange 24 and this sleeve was held in the hand. In other words, the piston 50, cylinder 68 and support 70 along with other components of FIG. 1 were not used.

Wheels of various diameters have been used satisfactorily, e.g., wheels having diameters of 3/16, 7/32, 1/4 and 5/16 inch. Various nonrigid and nonvibration-absorbing materials have been found to be suitable as a backing or support for the glass sheet on the side opposite the wheel. Such materials include solid rubber, felt on a steel backing and glass cloth on a steel backing.

During the cutting in accordance with any of the embodiments of the invention, a fluid, such as oil, can be fed to the glass surface to be contacted, but this fluid should be free of abrasive so that the life of the wheel is not adversely affected.

Stationary tools that each had a V-shaped contact edge with the included angle within the range of the included angle of the wheel edge of this invention were tried at the end of the focusing cone 26 to which they were brazed. The glass was moved relative to these fixed (nonrotary) tools and in contact therewith while imparting a mechanical load on the tool and with ultrasonic vibrations being imparted to the tool, using frequency, power, etc., in accordance with the conditions mentioned above. No abrasive-containing fluid was fed to the area of contact. The tools did not even score the glass surface. Instead there was chattering with resultant gouging of glass from the surface.

While the foregoing has described various embodiments of the invention, they have been presented merely for purpose of illustration. Many variations will be apparent to one skilled in the art. Thus, the invention is limited only by the claims which follow.

This application is a continuation of my application Serial No. 611,707, filed on September 24, 1956, and entitled "Apparatus and Method of Cutting Glass," now abandoned.

I claim:

1. An apparatus comprising a support, a wheel rotatably mounted to said support, means adapted to impart ultrasonic vibrations to said support and said wheel in a direction normal to the axis of rotation of said wheel, said wheel being made of a material used in a glass cutter wheel for scoring a glass sheet, means to support a glass sheet in tangential contact with said wheel and means to provide relative movement between the supported glass sheet and said wheel in a direction normal to the axis of rotation of said wheel and normal to the ultrasonic vibrations, whereby there is rolling contact between said wheel and the glass sheet during the ultrasonic vibrations.

2. An apparatus comprising a conveyor to support a glass sheet and to move the glass sheet in a horizontal path of travel, a support, a wheel rotatably mounted to said support with the bottom of the wheel in the horizontal path of travel afforded to the glass sheet by said conveyor and with the axis of rotation of said wheel being normal to the direction of travel of the glass sheet provided by said conveyor, said wheel having a V-shaped edge with an included angle between about 135 and 168 degrees, and means adapted to impart vertical ultrasonic vibrations to said support and said wheel in a direction normal to the axis of rotation of said wheel, said wheel being made of a material used in a glass cutter wheel for scoring a glass sheet.

3. The apparatus of claim 2 wherein the included angle of the V-shaped edge of the wheel is between 139 and 166 degrees and the means adapted to impart the ultrasonic vibrations includes a transducer and means to generate in said transducer a vibration between about 20 and 80 kilocycles per second.

4. The apparatus of claim 3 wherein the wheel is a tungsten carbide wheel having a thickness between about 1/32 and 5/32 inch.

5. An apparatus comprising a conveyor to support a glass sheet and to move the glass sheet in a horizontal path of travel, an ultrasonic transducer, a tapered ultrasonic-transmitting member supported by said transducer, and a wheel rotatably supported by said tapered member with the bottom of the wheel in the horizontal path of travel afforded to the glass sheet by said conveyor with the axis of rotation of said wheel being normal to the direction of travel of the glass sheet provided by said conveyor, said wheel having a V-shaped edge with an included angle between about 135 and 168 degrees and having an axis of rotation normal to the ultrasonic vibrations imparted in a vertical direction to said wheel by said transducer, said wheel being made of a material used in a glass cutter wheel for scoring a glass sheet.

6. An apparatus for cutting glass comprising a conveyor to support a glass sheet and to move the glass sheet in a horizontal path of travel, an ultrasonic transducer, a metal cone, a metal coupling bar connected at one end to said transducer and at the other end to said cone, and a wheel having a V-shaped edge with an included angle between 139 and 166 degrees and rotatably supported by said cone to rotate about an axis normal to ultrasonic vibrations imparted in a vertical direction to said wheel by said transducer, said wheel being made of a material used in a glass cutter wheel for scoring a glass sheet and said wheel being supported by said cone to have the bottom of said wheel in the horizontal path of travel afforded to the glass sheet by said conveyor with the axis of rotation of said wheel being normal to the direction of travel of the glass sheet provided by said conveyor.

7. An apparatus comprising an ultrasonic transducer, means to energize said transducer, a metal cone, a metal coupling bar connected at one end to said transducer and at the other end to the base of said cone, said coupling bar having a flange between said ends at a point coincident with the node of the ultrasonic vibrations imparted to said coupling bar by said transducer and said cone having a slot at its apex, and a passageway normal to said slot, an axle mounted in said passageway, a wheel rotatably mounted on said axle and partially in said slot, said wheel having a V-shaped edge with an included angle between 139 and 166 degrees and collar means adapted to maintain said axle in said passageway.

8. The apparatus of claim 7 and further including a housing engaging said flange, a support, means for moving the housing downwardly relative to the support, and means for introducing coolant fluid into the housing to cool the transducer.

9. The method which comprises imparting to a rotatable wheel having a V-shaped edge with an included angle between about 135 and 168 degrees ultrasonic vibrations in a direction normal to the axis of rotation of the wheel, imparting rolling contact between the wheel and a glass sheet along a line on a surface of the glass sheet with the rolling contact being in a direction normal to the axis of rotation of the wheel and normal to the direction of the ultrasonic vibrations while continuing the ultrasonic vibration to the wheel.

10. The method of cutting glass which comprises imparting to a rotatable wheel having a V-shaped edge with an included angle between 139 and 166 degrees ultrasonic vibrations between about 20 and 80 kilocycles per second in a direction normal to the axis of rotation of the wheel, supporting a glass sheet in a horizontal position with the upper surface of the glass sheet in tangential contact with the wheel while applying a load on the wheel of between about 10 and 30 pounds to apply through the wheel a load on the glass sheet, and moving the supported glass sheet in a horizontal direction normal to the axis of rotation of the wheel and normal to the ultrasonic vibrations for rolling contact between the wheel and the glass sheet while continuing the ultrasonic vibrations to the wheel.

11. The method of cutting glass which comprises imparting to a rotatable tungsten carbide wheel having a V-shaped edge with an included angle between 139 and 166 degrees ultrasonic vibrations between about 20 and 80 kilocycles per second in a direction normal to the axis of rotation of the wheel, supporting a glass sheet in a horizontal position with the upper surface of the glass sheet in tangential contact with the wheel while applying a load on the wheel of between about 10 and 30 pounds to apply through the wheel a load on the glass sheet, and moving the supported glass sheet in a horizontal direction between about 5 to 70 feet per minute normal to the axis of rotation of the wheel and normal to the ultrasonic vibrations for rolling contact between the wheel and the glass sheet while continuing the ultrasonic vibrations to the wheel to score the sheet as part of the cutting of the sheet into at least two smaller sheets.

References Cited in the file of this patent

UNITED STATES PATENTS

| | | |
|---|---|---|
| 2,580,716 | Balamuth | Jan. 1, 1952 |
| 2,680,333 | Calosi | June 8, 1954 |
| 2,707,849 | De Vore | May 10, 1955 |